US006937566B1

(12) United States Patent
Forslöw

(10) Patent No.: US 6,937,566 B1
(45) Date of Patent: Aug. 30, 2005

(54) DYNAMIC QUALITY OF SERVICE RESERVATION IN A MOBILE COMMUNICATIONS NETWORK

(75) Inventor: Jan E. Forslöw, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/087,496

(22) Filed: May 29, 1998

Related U.S. Application Data

(60) Provisional application No. 60/054,469, filed on Jul. 25, 1997.

(51) Int. Cl.[7] .............................................. H04L 12/26
(52) U.S. Cl. .................... 370/231; 370/332; 370/395.21
(58) Field of Search ................................ 370/231, 235, 370/236, 252, 310, 322, 329, 332, 338, 341, 348, 392, 401, 404, 407, 411, 412, 429

(56) References Cited

U.S. PATENT DOCUMENTS

| | | | |
|---|---|---|---|
| 5,524,006 A | | 6/1996 | Hluchyj et al. |
| 5,638,371 A | * | 6/1997 | Raychaudhuri et al. ..... 370/347 |
| 5,708,655 A | | 1/1998 | Toth et al. |
| 5,729,537 A | | 3/1998 | Billström |
| 5,729,542 A | | 3/1998 | Dupont |
| 5,790,534 A | | 8/1998 | Kokko et al. |
| 5,852,718 A | | 12/1998 | Van Loo |
| 5,970,062 A | * | 10/1999 | Bauchot ...................... 370/345 |
| 5,991,292 A | | 11/1999 | Focsaneanu et al. |
| 6,021,263 A | * | 2/2000 | Kujoory et al. ............. 709/232 |
| 6,081,517 A | | 6/2000 | Liu et al. |
| 6,094,435 A | * | 7/2000 | Hoffman et al. ............ 370/414 |
| 6,094,581 A | | 7/2000 | Fried et al. |
| 6,097,733 A | | 8/2000 | Basu et al. |
| 6,122,263 A | | 9/2000 | Dahlin et al. |
| 6,157,648 A | | 12/2000 | Voit et al. |
| 6,188,697 B1 | * | 2/2001 | Umehira et al. ............ 370/412 |
| 6,374,112 B1 | * | 4/2002 | Widegren et al. ........... 455/452 |
| 6,603,738 B1 | * | 8/2003 | Kari et al. ............... 370/230.1 |

FOREIGN PATENT DOCUMENTS

| | | |
|---|---|---|
| EP | 0 789 499 A | 8/1997 |
| WO | 95/25407 A | 9/1995 |
| WO | 96/09708 A | 3/1996 |
| WO | 97/47112 A | 12/1997 |

OTHER PUBLICATIONS

H. Schulzrinne et al., Network Working Group, Request for Comments: 2326, Category: Standards Track, Apr. 1998, "Real Time Streaming Protocol".

C. Rigne, Network Working Group, Request for Comments: 2139, Obsoletes: 2059, Category: Informational, Apr. 1998, "RADIUS Accounting".

R. Braden et al., Network Working Group, Request for Comments: 2205, Category: Standards Track, RFC 2205, Sep. 1997, Resource ReSerVation Protocol (RSVP)—Version 1 Functional Specification.

(Continued)

Primary Examiner—Man U. Phan
Assistant Examiner—Toan D. Nguyen
(74) Attorney, Agent, or Firm—Nixon & Vanderhye P.C.

(57) ABSTRACT

In a mobile communications system, a mobile host communicates packet data with an external network by way of a packet gateway node. The mobile host establishes a packet session during which plural application flows are communicated with an external network entity. Each application flow includes a corresponding stream of packets. In addition, a corresponding quality of service parameter is defined and reserved for each of the plural application flows. In this way, different quality of service parameters may be defined and reserved for different ones of the application flows. Packets corresponding to each of the application flows are then delivered, for example, from the external network entity all the way to the mobile host in accordance with the quality of service reserved for that application flow. Different qualities of service may have different allocated bandwidths, delays, and/or reliabilities.

33 Claims, 14 Drawing Sheets

OTHER PUBLICATIONS

R. Droms, Network Working Group, Request for Comments: 2131, Obsoletes: 1541, Category: Standards Track, Mar. 1997, "Dynamic Host Configuration Protocol".

C. Rigney et al., Network Working Group, Request for Comments: 2138, Obsoletes: 2058, Category: Standards Track, Apr. 1997, "Remote Authentication Dial In User Service (RADIUS)".

W. Simpson, Network Working Group, Request for Comments: 1661, STD: 51, Obsoletes: 1548, Category: Standards Track, Jul. 1994, "The Point–to–Point Protocol (PPP)".

H. Schulzrinne et al., Network Working Group, Request for Comments: 1889, Category Standards Track,Jan. 1996, "RTP: A Transport Protocol for Real–Time Applications".

Michael Patrick, DHC Working Group, Nov. 24, 1997, "DHCP Relay Agent Information Option".

A. Valencia et al., PPP Working Group, Internet Draft, Category: Internet Draft, Title: draft–ietf–pppext–12tp–11.txt, May 1998, "Layer Two Tunneling Protocol 'L2TP'".

O. Gudmundsson et al., DHC Working Group, Internet Draft, Mar. 1998, "Security Requirements for the DHCP Protocol".

Alexander, "DHCP Options and BOOTP Vendor Extensions", Mar. 1997, rfc2132.

Braden et al., Recommendations on Queue Management and Congestion Avoidance in the Internet, Apr. 1998, draft–irtf–e2e–queue–mgt.00.txt.

Braden et al, "Resource Reservation Protocol Version I Functional Specification", Sep. 1997, draft–ietf–rsvp–spec–14.ps.

Gudmundsson, Security Architecture for DHCP, Mar. 1997, draft–ietf–dhc–security–arch–00.txt.

Patrick, "DHCP Agent–Supplied Options", Dec. 1996–draft–ietf–dhc–agent–options–00.txt.

Sathaye, "ATM Forum Traffic Management Specification Version 4.0", Apr. 1996, af–tm–0056.000.

Shenker et al., "General Characterization Parameters for Integrated Service Network Elements", Oct. 1996, draft–ietf–intserv–charac–02.txt.

GSM 02.60, "Digital Cellular Telecommunications System" (Phase 2+), GPRS, Service Description, Stage I, version 1.9.0, Oct. 1996.

GSM 03.60, "Digital Cellular Telecommunications System" (Phase 2+), GPRS, Service Description, Stage 2, version 2.0.0, May 1997.

GSM 03.64, "Digital Cellular Telecommunications System" (Phase 2+), GPRS, Overall Description of GPRS Radio Interface, Stage 2, Version 2.0.0, Mar. 1997.

* cited by examiner

Signalling Sequence for IP Host Configuration.

QoS Reservation: Mobile Terminating Traffic Case.

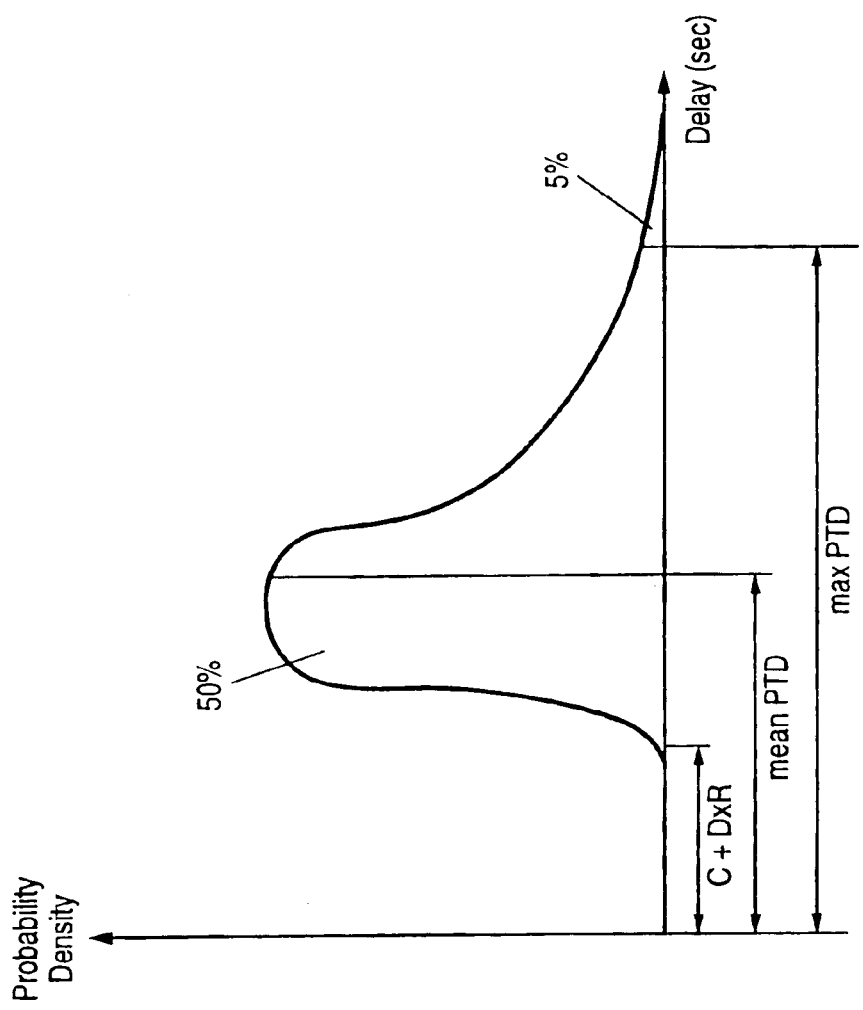

DYNAMIC QUALITY OF SERVICE RESERVATION IN A MOBILE COMMUNICATIONS NETWORK

RELATED APPLICATION

This application claims priority from U.S. Provisional Patent Application Ser. No. 60/054,469, filed Jul. 25, 1997, the disclosure of which is incorporated by reference.

FIELD OF THE INVENTION

The present invention relates to mobile communications, and more particularly, to the reservation of a particular class or quality of service for individual mobile communications.

BACKGROUND AND SUMMARY OF THE INVENTION

The main application of most mobile radio systems like the Global System for Mobile communications (GSM) has been mobile telephony. However, the use of mobile data applications like facsimile transmission and short message exchange is becoming more popular. New data applications include wireless personal computers, mobile offices, electronic funds transfer, road transport telemetry, field service businesses, fleet management, etc. These applications are characterized by "bursty" traffic. In other words, a relatively large amount of data is transmitted over a relatively short time interval followed by significant time intervals when little or no data is transmitted.

In bursty traffic situations, packet-switched communications mechanisms better utilize the transmission medium than circuit-switched mechanisms. In a packet-switched network, the transmission medium is used only on demand, and a single physical channel can be shared by many users. Another advantage is that in contrast to time-oriented charging applied for circuit-switched connections, packet-switched data services allow charging depending on the amount of data transmission and on the quality of service of that transmission.

In order to accommodate these new mobile applications, packet radio services, like the General Packet Radio Service (GPRS) incorporated in GSM, accommodate connectionless, packet-switched data services with high bandwidth efficiency. Cellular Digital Packet Data (CDPD) networks are another example. A significant interest of end users of a mobile packet data service such as GPRS is that wireless PCs support conventional Internet-based applications like file transfer, submission and reception of e-mail, and "surfing" the Internet via the worldwide web. Video is also a possible important element of multimedia services that may ultimately be supported by GPRS-type services.

FIG. 1 shows a mobile data service from a user's point of view in the context of a mobile communications system 10. An end user communicates data packets using a mobile host 12 including for example a laptop computer 14 connected to a mobile terminal 16. The mobile host 12 communicates for example with a fixed computer terminal 18 incorporated in a local area network (LAN) 20 through a mobile packet data support node 22 via one or more routers 24, a packet data network 26, and a router 28 in the local area network 20. Of course, those skilled in the art will appreciate that this drawing is simplified in that the "path" is a logical path rather than an actual physical path or connection. In a connectionless data packet communication between the mobile host 12 and fixed terminal 18, packets are routed from the source to the destination independently and do not necessarily follow the same path (although they can).

Thus, independent packet routing and transfer within the mobile network is supported by a mobile packet data support node 22 which acts as a logical interface or gateway to external packet networks. A subscriber may send and receive data in an end-to-end packet transfer mode without using circuit-switched mode network resources. Moreover, multiple point-to-point, parallel sessions are possible. For example, a mobile host like a mobile PC might run several applications at one time like a video conference, an e-mail communication, or facsimile web browsing, etc.

FIG. 2 shows a more detailed mobile communications system using the example GSM mobile communications model that supports both circuit-switched and packet-switched communications. A mobile host 12 including a computer terminal 14 and mobile radio 16 communicates over a radio interface with one or more base stations (BSs) 32. Each base station 32 is located in a corresponding cell 30. Multiple base stations 32 are connected to a base station controller (BSC) 34 which manages the allocation and deallocation of radio resources and controls handovers of mobile stations from one base station to another. A base station controller and its associated base stations are sometimes referred to as a base station subsystem (BSS). The BSC 34 is connected to a mobile switching center (MSC) 36 through which circuit-switched connections are set up with other networks 38 such as the Public Switched Telephone Network (PSTN), Integrated Services Digital Network (ISDN), etc.

The MSC 36 is also connected via a Signaling System Number 7 (SS7) network 40 to a Home Location Register (HLR) 42, a Visitor Location Register (VLR) 44, and Authentication Center (AuC) 46. The VLR 44 includes a database containing the information about all mobile stations currently located in a corresponding location or service area as well as temporary subscriber information needed by the MSC to provide services to mobiles in its service area. Typically, when a mobile station enters a visiting network or service area, the corresponding VLR 44 requests and receives data about the roaming mobile station from the mobile's HLR and stores it. As a result, when the visiting mobile station is involved in a call, the VLR 44 already has the information needed for call setup.

The HLR 42 is a database node that stores and manages subscriptions. For each "home" mobile subscriber, the HLR contains permanent subscriber data such as the mobile station ISDN number (MSISDN) which uniquely identifies the mobile telephone subscription in the PSTN numbering plan and an international mobile subscriber identity (IMSI) which is a unique identity allocated to each subscriber and used for signaling in the mobile networks. All network-related subscriber information is connected to the IMSI. The HLR 42 also contains a list of services which a mobile subscriber is authorized to use along with a current subscriber location number corresponding to the address of the VLR currently serving the mobile subscriber.

Each BSC 34 also connects to a GPRS network 51 at a Serving GPRS Support Node (SGSN) 50 responsible for delivery of packets to the mobile stations within its service area. The gateway GPRS support node (GGSN) 54 acts as a logical interface to external data packet networks such as the IP data network 56. SGSN nodes 50 and GGSN nodes 54 are connected by an intra-PLMN IP backbone 52. Thus, between the SGSN 50 and the GGSN 54, the Internet protocol (IP) is used as the backbone to transfer data packets. Within the GPRS network 51, packets or protocol data units (PDUs) are encapsulated at an originating GPRS support node and decapsulated at the destination GPRS support node. This encapsulation/decapsulation at the IP level between the SGSN 50 and the GGSN 54 is called "tunneling" in GPRS. The GGSN 54 maintains routing information used to "tunnel" PDUs to the SGSN 50 currently serving the mobile station. A common GPRS Tunnel Protocol (GTP) enables different packet data protocols to be employed even if those protocols are not supported by all of the SGSNs. All GPRS user-related data needed by the SGSN to perform the routing and data transfer functionality is accessed from the HLR 42 via the SS7 network 40. The HLR 42 stores routing information and maps the IMSI to one or more packet data protocol (PDP) addresses as well as mapping each PDP address to one or more GGSNs.

Before a mobile host can send packet data to a corresponding external host like the Internet service provider (ISP) 58 in FIG. 2, the mobile host 12 has to "attach" to the GPRS network 51 to make its presence known and to create a packet data protocol (PDP) context to establish a relationship with a gateway GGSN 54 towards the external network that the mobile host is accessing. The attach procedure is carried out between the mobile host 12 and the SGSN 50 to establish a logical link. As a result, a temporary logical link identity is assigned to the mobile host 12. A PDP context is established between the mobile host and the GGSN 54. The selection of GGSN 54 is based on the name of the external network to be reached. One or more application flows (sometimes called "routing contexts") may be established for a single PDP context through negotiations with the GGSN 54. An application flow corresponds to a stream of data packets distinguishable as being associated with a particular host application. An example application flow is an electronic mail message from the mobile host to a fixed terminal. Another example application flow is a link to a particular Internet Service Provider (ISP) to download a graphics file from a web site. Both of these application flows are associated with the same mobile host and the same PDP context.

Connectionless data communications are based on specific protocol procedures, which are typically separated into different layers. FIG. 3 shows a GPRS "transmission plane" that is modeled with multi-layer protocol stacks. Between the GGSN and the SGSN, the GPRS tunneling protocol (GTP) tunnels the PDUs through the GPRS backbone network 52 by adding routing information. The GTP header contains a tunnel end point identifier for point-to-point and multicast packets as well as a group identity for point-to-multipoint packets. Additionally, a type field that specifies the PDU type and a quality of service profile associated with a PDP context session are included. Below the GTP, the well-known Transmission Control Protocol/User Diagram Protocol (TCP/UDP) and Internet Protocol (IP) are used as the GPRS backbone network layer protocols. Ethernet, frame relay (FR), or asynchronous transfer mode (ATM)-based protocols may be used for the link and physical layers depending on the operator's network architecture.

Between the SGSN and mobile station/host, a SubNetwork Dependent Convergence Protocol (SNDCP) maps network level protocol characteristics onto the underlying logical link control (LLC) and provides functionalities like multiplexing of network layer messages onto a single virtual logical connection, ciphering, segmentation, and compression. A Base Station System GPRS Protocol (BSSGP) is a flow control protocol, which allows the base station system to start and stop PDUs sent by the SGSN. This ensures that the BSS is not flooded by packets in case the radio link capacity is reduced, e.g., because of fading and other adverse conditions. Routing and quality of service information are also conveyed. Frame relay and ATM may be used to relay frames of PDUs over the physical layer.

Radio communication between the mobile station and the GPRS network covers physical and data link layer functionality. The physical layer is split up into a physical link sublayer (PLL) and a physical RF sublayer (RFL). RFL performs modulation and demodulation of the physical waveforms and specifies carrier frequencies, radio channel structures, and raw channel data rates. PLL provides services for information transfer over the physical radio channel and includes data unit framing, data coding, and detection/correction of physical medium transmission areas. The data link layer is separated into two distinct sublayers. The radio link control/medium access control (RLC/MAC) sublayer arbitrates access to the shared physical radio medium between multiple mobile stations and the GPRS network. RLC/MAC multiplexes data and signaling information, performs contention resolution, quality service control, and error handling. The logical link control (LLC) layer operates above the MAC layer and provides a logical link between the mobile host and the SGSN.

Quality of service corresponds to the goodness (quality) with which a certain operation (service) is performed. Certain services like multimedia applications or a simple phone call need guarantees about accuracy, dependability, and speed of transmission. Typically, in data communications, "best efforts" are employed, and no special attention is paid to delay or throughput guarantees. Generally, quality of service parameters can be characterized qualitatively in three services classes including deterministic (used for hard, real-time application), statistical (used for soft real-time applications), and best effort (everything else where no guarantees are made). Quantitative parameters may include throughput (such as the average data rate or peak data rate), reliability, delay, and jitter corresponding to the variation delay between a minimum and maximum delay time that a message experiences.

In the context of providing quality of service (QoS) in a mobile data communications systems, one QoS approach is to assign a specific priority to each PDP context. But this approach is unsatisfactory. As defined above, each PDP context may have plural application flows. Each application flow in a current PDP context/session likely has different per packet delay needs. For example, real time applications like telephony require a guaranteed service while image video needs a predicted delay service. More specifically, elastic applications like interactive bursts, interactive bulk transfer, and asynchronous bulk transfer require different degrees of as soon as possible (or best effort) delay service.

Rather than limiting the quality of service to a single PDP context/single network level IP address, the present invention defines a quality of service for each individual application flow. An appropriate quality of service is separately reserved, monitored, and regulated for each application flow in a PDP context. Moreover, the present invention provides a dynamic quality of service reservation mechanism per PDP context which is introduced into a mobile data communications system in order to function as a quality of service "aware" client network layer that permits integration with other data service architectures such as the Internet to permit an end-to-end integrated service where quality of service can be specified from the mobile host all the way to a fixed host in an end-to-end communication.

A mobile communication system is provided where a mobile host communicates packet data with an external network by way of a packet gateway node. The mobile host establishes a packet session during which plural application flows are communicated with an external network entity. Each application flow includes a corresponding stream of packets. In addition, a corresponding quality of service parameter is defined and reserved for each of the plural application flows. In this way, different quality of service parameters may be defined and reserved for different ones of the application flows. Packets corresponding to each of the application flows are then delivered, for example, from the external network entity all the way to the mobile host in accordance with the quality of service reserved for that application flow.

Different qualities of service may have different allocated bandwidths, delays, and/or reliabilities. One class of service is best effort where packets in an application flow may be dropped. Other classes of service are classified as predictive where packets in an application flow are not dropped. In terms of delay, quality of service may include delay classes that specify a maximum packet transfer rate, a mean packet transfer rate, and a packet burst size of an individual application flow.

Data services subscription information is stored for each mobile host and specifies whether the mobile host subscribes to a static or dynamic quality of service. If a dynamic quality of service is subscribed to where QoS may be specified for each application flow, the subscription information for such a mobile host defines specifically subscribed to quality of service parameters or classes. Then when the mobile host establishes a packet session, each subscribed quality of service class is made available for application flows which are activated during that session.

The process of establishing a packet session includes the mobile host "attaching" to the network (or other equivalent operation) and communicating a packet session start/activate message to the gateway node. Moreover, an end-to-end configuration procedure is established between the mobile terminal and the external network entity at the other end. That end-to-end configuration assigns a network packet layer address to the mobile host. Several end-to-end configurations may exist on the same PDP context, and several application flows may exist using the same configuration. As a result, plural application flows may be flexibly established during the mobile host session having different network layer (e.g., IP) addresses and different qualities of service. In the configuration procedure, the gateway node functions as a dynamic host configuration agent serving the client mobile host relaying packets between the mobile host and the external network entity.

In addition to the data communications "tunnel" corresponding to the network layer bearer between the gateway node and the mobile host, a relationship is also established in the gateway node between a mobile host identifier (e.g., the mobile's IMSI), the established data communications tunnel, and the network layer address stored for the mobile host for the established session. Using this relationship, the gateway node analyzes received packets and only permits those packets having a destination or source corresponding to one of the mobile host network layer addresses stored for the established session.

After making a reservation request for a particular quality of service for an individual application flow, a determination is made whether the reservation request can be met under current traffic conditions. If the reservation request can be met, the network packet layer bearer between the mobile host and the gateway node is established to "bear" plural ones of the individual application flows having different corresponding quality of service classes.

In addition to the packet gateway node, a packet serving node is provided between the packet gateway node and the mobile host. Among other things, the serving node determines if the reservation request for the particular quality of service can be supported from the serving node to the mobile host based on a current traffic load of existing radio communications in the area where the mobile host is currently being served. In particular, the serving node estimates delay and bandwidth requirements corresponding to the requested quality of service and provides them to the gateway node. Once an application flow reservation is made for a particular quality of service, the gateway node monitors that application flow to ensure that the reserved quality of service is met using appropriate packet classifying and transfer scheduling procedures.

For packets destined for mobile hosts, the serving node merges those packets from different sessions corresponding to the same mobile hosts which have the same quality of service. The serving node also merges packets destined for different mobile hosts located in the same geographical service area that have the same quality of service. Packets destined for the same geographical service area but having different qualities of service are assigned to different priority queues that correspond to those different qualities of service and are forwarded to the particular radio access network within the geographical area.

BRIEF DESCRIPTION OF THE DRAWINGS

The foregoing and other objects, features, and advantages of the invention will be apparent from the following description of preferred embodiments as illustrated in the accompanying drawings in which reference characters refer to the same parts throughout the various views. The drawings are not necessarily to scale with emphasis being placed upon illustrating the principles of the invention.

FIG. 9 is a graph illustrating delay probability definitions for a GPRS bearer;

DETAILED DESCRIPTION OF THE DRAWINGS

In the following description, for purposes of explanation and not limitation, specific details are set forth, such as particular embodiments, hardware, techniques, etc. in order to provide a thorough understanding of the invention. However, it will be apparent to one skilled in the art that the present invention may be practiced in other embodiments that depart from these specific details. For example, while a specific embodiment of the present invention is described in the context of a GSM/GPRS cellular telephone network, those skilled in the art will appreciate that the present invention can be implemented in any mobile communications system using other mobile data communications architectures and/or protocols. In other instances, detailed descriptions of well-known methods, interfaces, devices, and signaling techniques are omitted so as not to obscure the description of the present invention with unnecessary detail.

Figure 1:
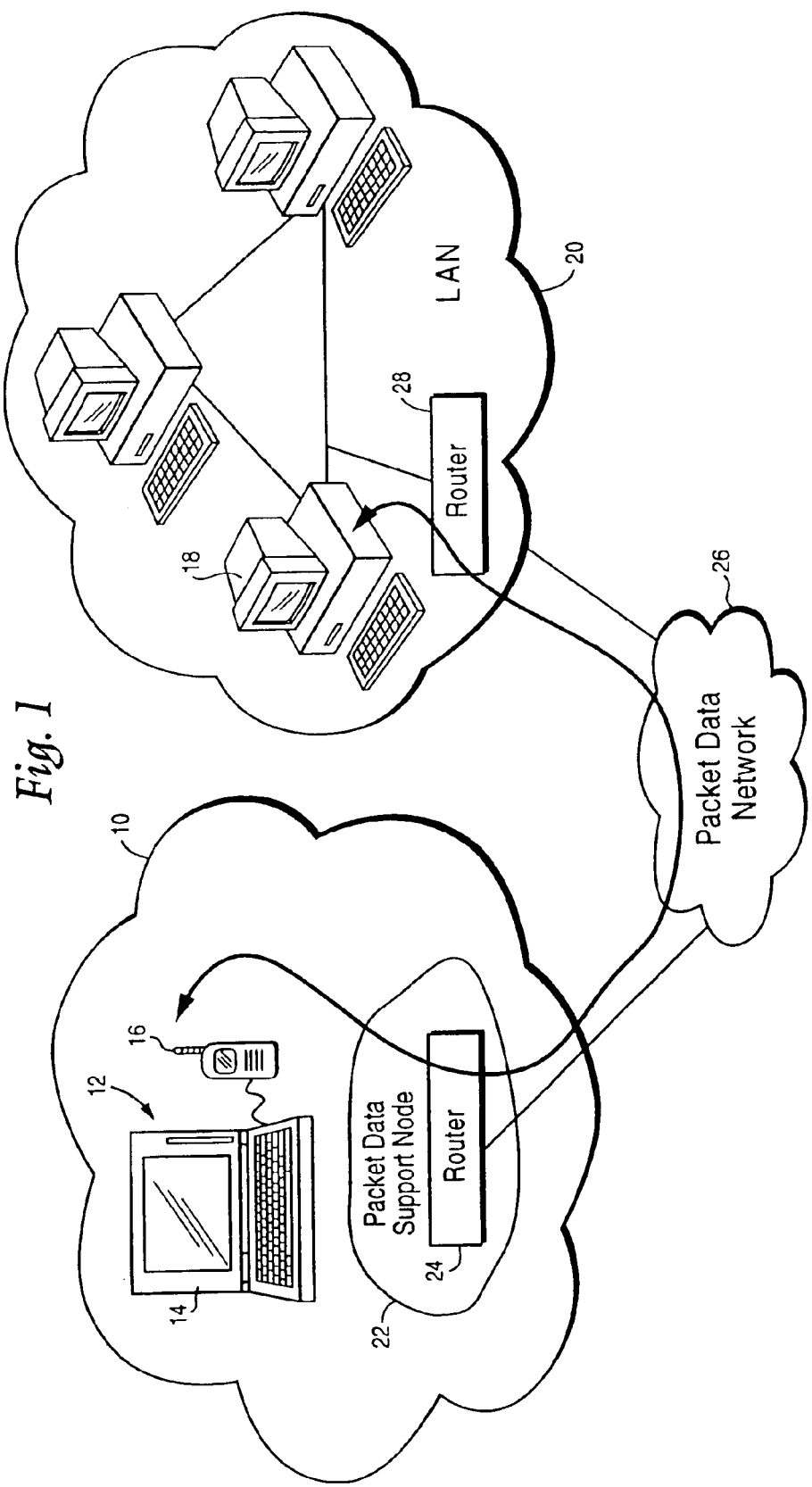
FIG. 1 is a simplified diagram showing a data communications between a mobile host and a fixed host.
Figure 2:
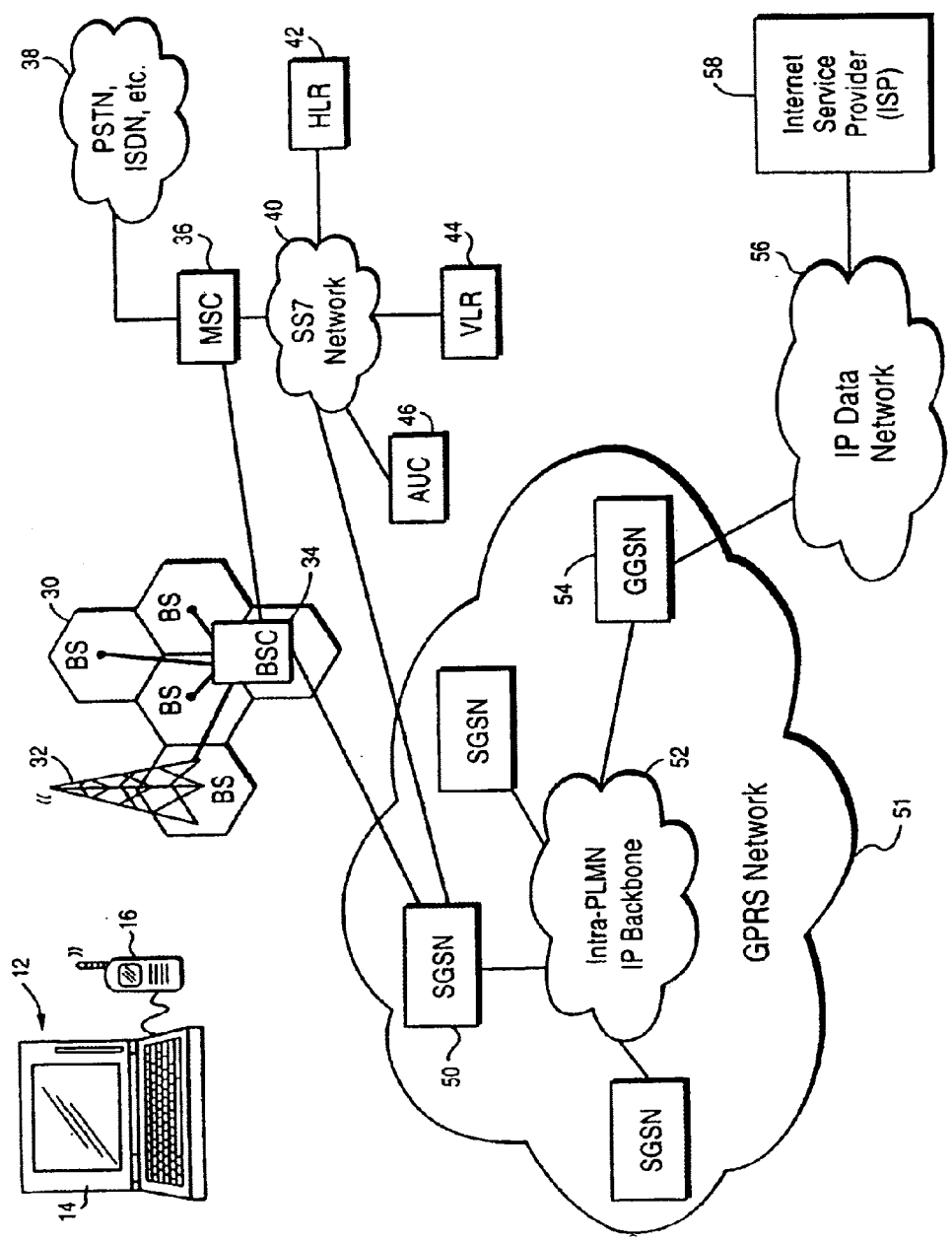
FIG. 2 is a more detailed diagram showing a GSM mobile communications system including a General Packet Radio Service (GPRS) data network.
Figure 3:
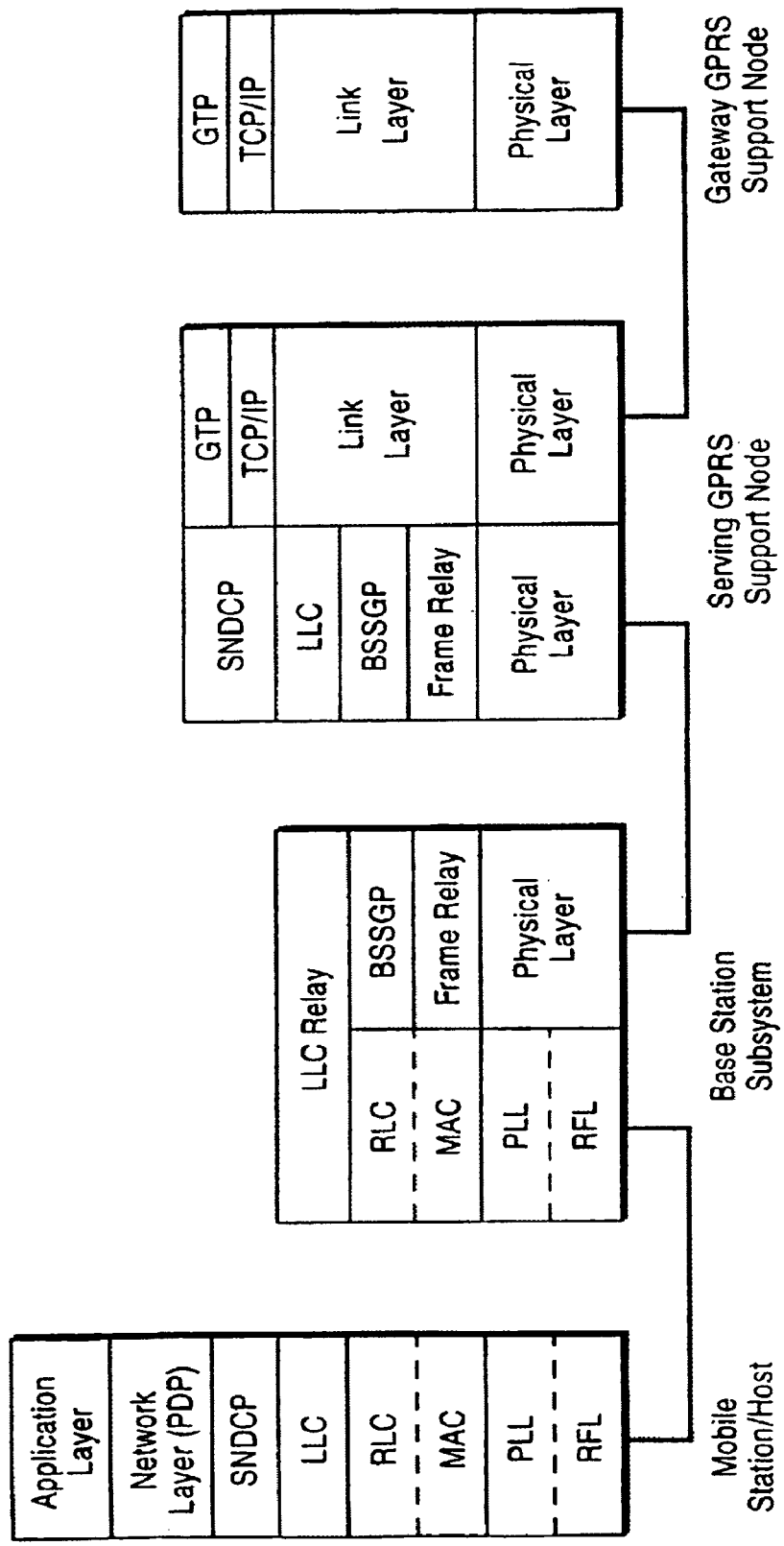
FIG. 3 illustrates various data communication protocols employed between different nodes in the GPRS data communications network shown in FIG. 2.
Figure 4:
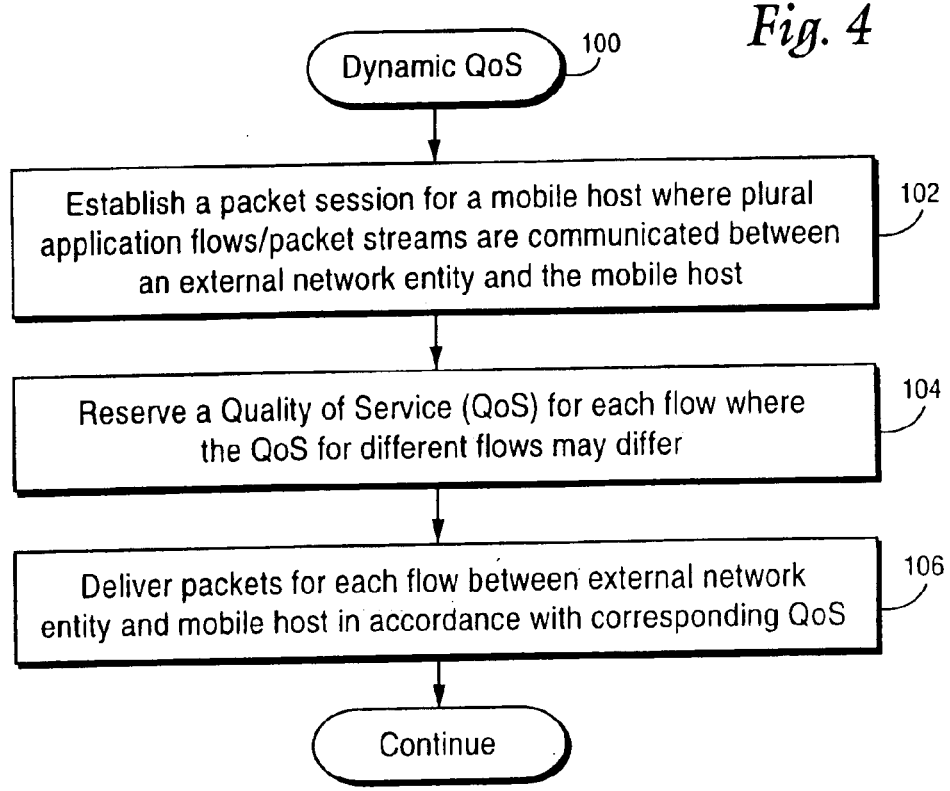
FIG. 4 is a flowchart diagram illustrating dynamic quality of service procedures in accordance with one embodiment of the present invention.

As described above, the present invention provides considerable flexibility and a wide range of data services to mobile subscribers by permitting definition and reservation of a specific quality of service for each of plural application flows activated during a data session rather than restricting all application flows to a single quality of service assigned to the session. Referring to FIG. 4 which illustrates a dynamic quality of service routine (block 100), in accordance with a first embodiment of the present invention, a packet session is established for each mobile host. During that established packet session, plural application flows/packet streams are communicated between an external network entity like the fixed terminal 18 shown in FIG. 1 or an Internet service provider (ISP) shown in FIG. 2, and the mobile host such as the mobile host 12 shown in FIGS. 1 and 2 (block 102). A quality of service (QoS) is reserved (if available given current traffic conditions) for each application flow during the established packet session, and notably, the quality of service for different application flows may differ (block 104). Packets corresponding to each application flow are delivered between the external network entity and the mobile host in accordance with the reserved corresponding quality of service (block 106). The established packet session may, thus, serve as a bearer for plural serial application sessions without requiring reestablishment and reconfiguration of the mobile host. The established packet session may also serve as a bearer for plural streams in one multimedia session while still adhering to individual quality of service requirements of voice, video, and data streams.

Figure 5:
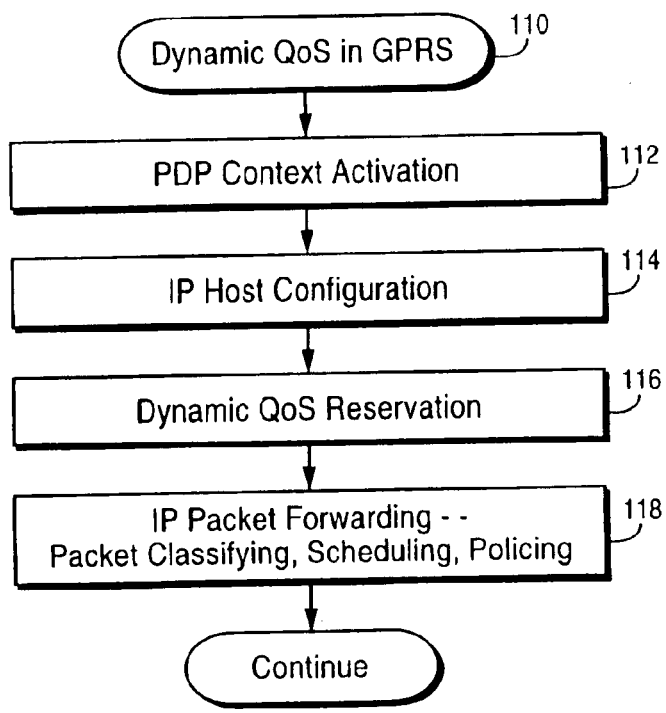
FIG. 5 is a flowchart diagram depicting illustrating dynamic quality of service procedures in GPRS in accordance with another example embodiment of the present invention.

While the present invention may be advantageously applied to any mobile data communications network, a detailed example embodiment is now described in the context of the General Packet Radio Service (GPRS) employed in the well known GSM mobile radio communications network. FIG. 5 illustrates in flowchart format general procedures for providing a dynamic quality of service in GPRS in this detailed example embodiment (block 110). The first set of procedures relate to PDP context activation (block 112), where PDP means Packet Data Protocol corresponding to the network layer protocol used in the data communications system. Another way of describing a PDP context is that the mobile host has "logged-on" and started a data session with GPRS. In GPRS, there are two example PDPs that may be used including Internet Protocol (IP) v4 and X.25. IP is assumed for purposes of the following example. The HLR 42 in FIG. 2 stores PDP contexts for each mobile subscriber in corresponding subscription records. The PDP subscription record includes subscribed quality of service profiles/parameters, subscribed external networks, etc. When a mobile system "attaches" to the GPRS network, the mobile host's subscription is retrieved from the HLR 42. As a result of PDP context activation, a network layer "bearer" or tunnel is established between the mobile host and the gateway GPRS support node (GGSN) 54.

After the PDP context activation, a network layer, e.g., IP, host configuration operation is performed to establish a network layer (IP) bearer communication between the mobile host 12 and an Internet Service Provider (ISP) 58 (block 114). The IP configuration includes assigning a network layer (IP) address to the mobile host, setting default values for a World Wide Web (WWW) server, a domain name server (DNS), an address resolution protocol (ARP) cache, etc. The IP bearer between the mobile host and the GGSN established in PDP context activation is now extended from the GGSN to the ISP. Packets can be routed back and forth between the mobile host and end-systems at the ISP.

The next step is dynamic quality of service reservation (block 116) in which a specific quality of service is reserved for each application flow established during the activated PDP context/data session (block 116). A number of procedures are performed (described below) to ensure that there is sufficient capacity for the requested QoS reservation and that the requesting mobile host is authorized to request reservation of the particular quality of service.

The final step relates to the forwarding of IP data packets between the external host such as the ISP 58 and the mobile host 12 (block 118): Such IP packet forwarding includes packet classifying, scheduling/queuing, and policing procedures (block 118). Detailed procedures for each of blocks 112–118 are now described in turn below.

Figure 6:
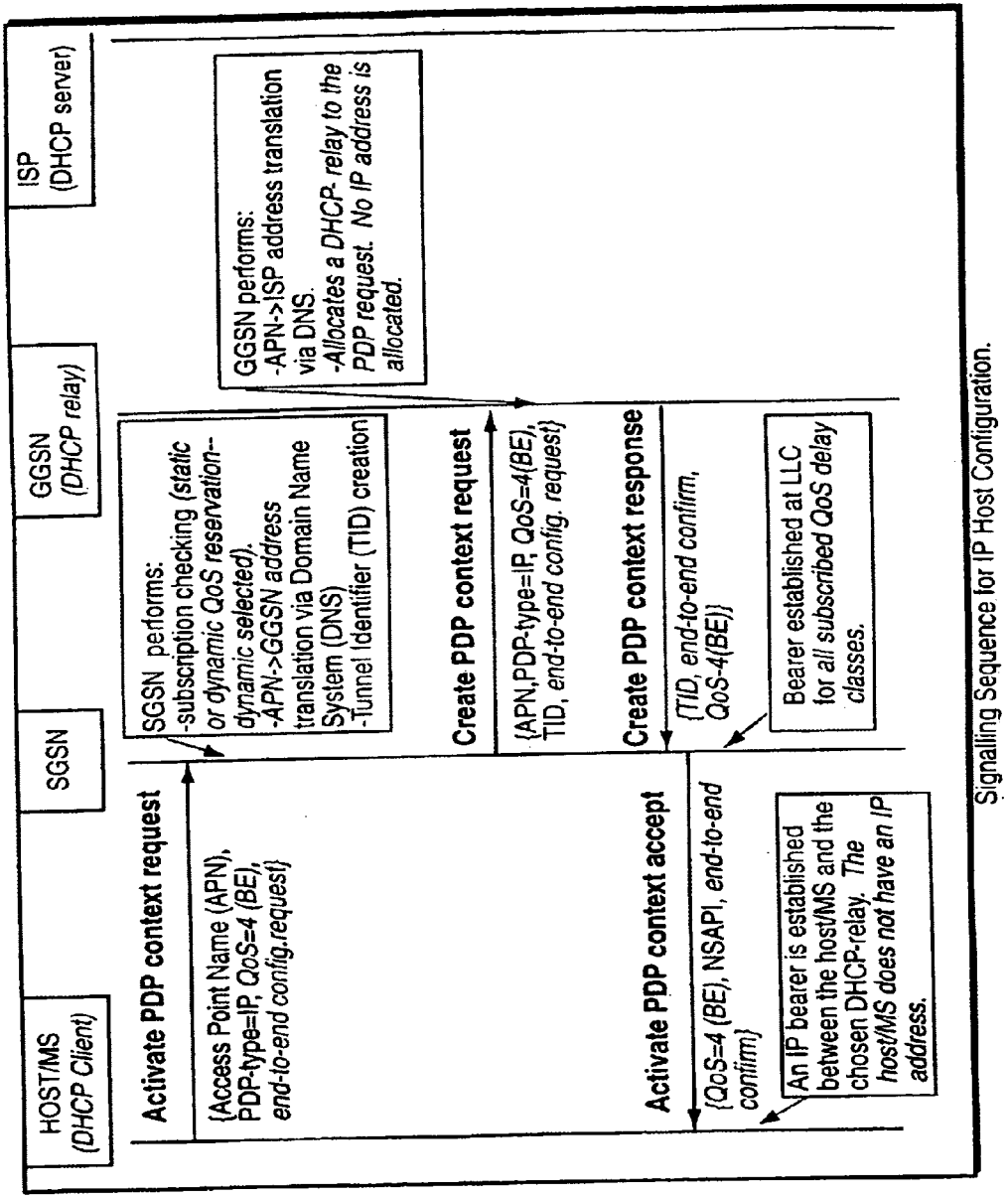
FIG. 6 is a signaling sequence for PDP context activation in accordance with a detailed example GPRS embodiment of the present invention.

FIG. 6 illustrates a signaling sequence for PDP context activation. Each vertical line in FIG. 6 represents a node illustrated in FIG. 2 including the mobile host (host/MS) 12, the SGSN 50, the GGSN 54, and the Internet Service Provider (ISP) 58. The mobile host sends an "activate PDP context request" message to the SGSN which includes an access point name (APN), i.e., the name of the ISP, a PDP type which in this example is IP, a Quality of Service (QoS) definition for this PDP context request itself which in this example is QoS class 4 Best Efforts (BE), and an end-to-end configuration request. Rather than requesting an IP address, the mobile host sends the end-to-end configuration request parameter to request a dynamic PDP address allocation after the PDP context has been established.

Upon receiving the activate PDP context request message from the mobile host, the SGSN checks the mobile's subscription in the HLR to determine whether the mobile host subscribes to a static or dynamic quality of service reservation. In static QoS reservation, all application flows receive the QoS established for the PDP context/data session. In dynamic QoS reservation, a QoS may be specified for individual application flows. A dynamic quality of service reservation subscription is assumed in this example. The access point name is translated to a GGSN address using the domain name system (DNS), i.e., the on-line distributed database system used to map human-readable machine names into IP addresses. In addition, a tunnel identifier (TID) is created for purposes of establishing a tunnel bearer between the GGSN and the mobile host. The SGSN sends to the GGSN a "create PDP context request" message along with the APN, PDP type, quality of service, TID, and end-to-end configuration request.

The GGSN functions as a dynamic host configuration protocol (DHCP) relay agent. DHCP is a protocol for allocating Internet protocol addresses to users. The allocation of the IP address is performed by a DHCP server, which in this example is the ISP 58, and the mobile host is the DHCP client. The GGSN also performs translation of the access point name to the ISP address via the domain name system, and allocates a DHCP relay to the PDP request. Again, no IP address is yet allocated to the mobile host. The GGSN sends a "create PDP context response" message back to the SGSN which includes the tunnel identifier (TID) and an end-to-end configuration confirmation using a best efforts quality of service. The GGSN, functioning as the DHCP relay, selects a predefined tunnel or bearer for the selected access point name. The SGSN then sends an "activate PDP context accept" message to the mobile host. At this point, the logical tunnel/bearer is essentially open for packet traffic between the mobile host and the ISP, but only as IP broadcast messages because the mobile host is not addressable on network (IP) layer. Application flows transmitted via that logical link may have any one of the subscribed to quality of service parameters/classes.

Figure 7:
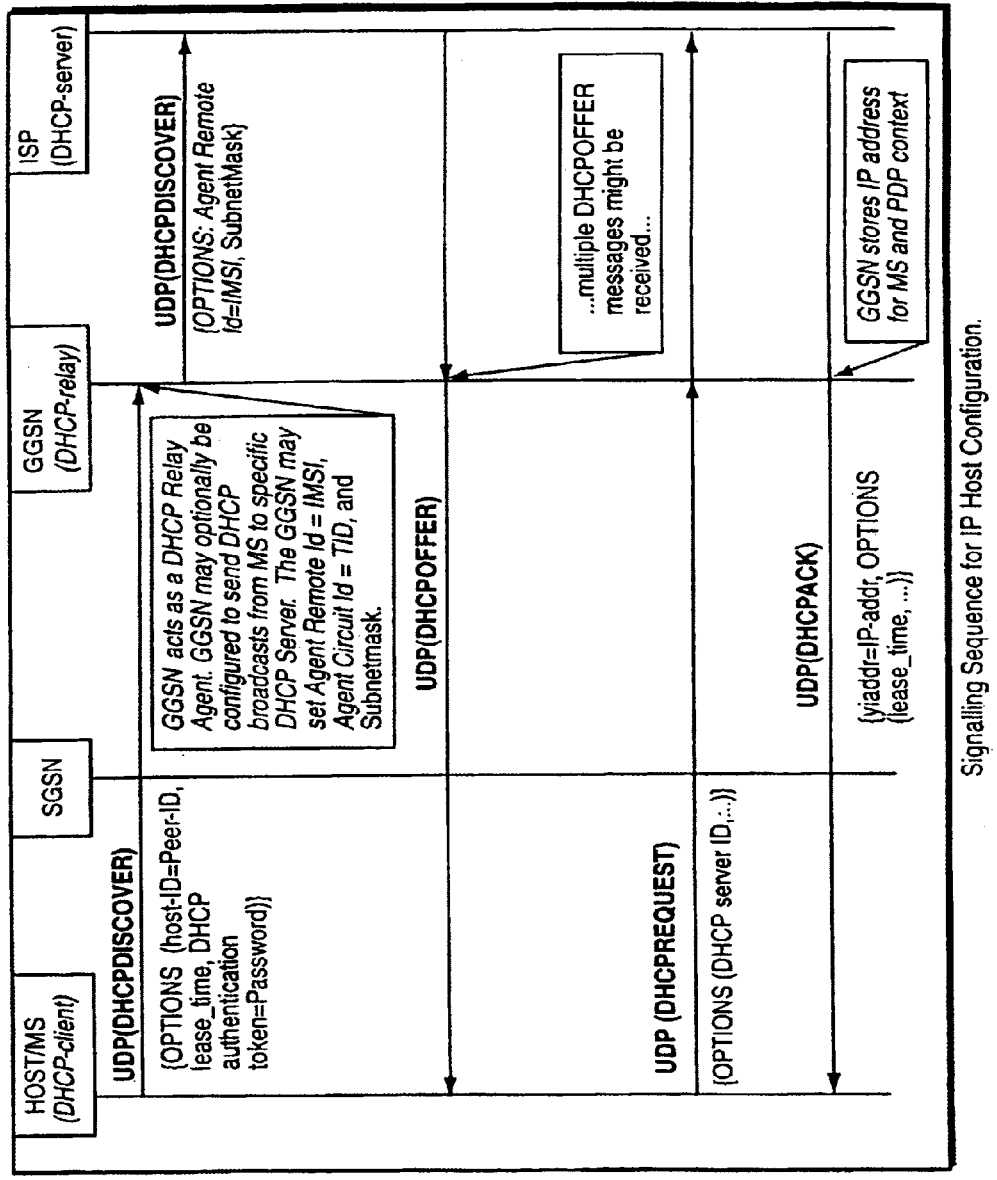
FIG. 7 is a signaling sequence for a network layer host configuration in accordance with the detailed GPRS example embodiment of the present invention.

The IP host configuration procedures are now described in conjunction with the signaling sequence shown in FIG. 7. The IP host configuration is transparent to the GPRS bearer set up in the PDP context activation procedures described above except for the inclusion of a DHCP relay agent in the GGSN. In the IP host configuration, the mobile host sends/broadcast a user datagram protocol (UDP) message (a transport layer protocol on top of IP) to the GGSN/DHCP relay which relays those UDP packets to the ISP. The UDP message includes a Dynamic Host Configuration Protocol (DHCP) DISCOVER message with an authentication token, IP address lease time request, and a host ID. The GGSN allocates an agent remote ID corresponding to the mobile's unique IMSI identifier and an agent circuit ID corresponding to the tunnel identifier. The GGSN later uses the agent circuit ID to filter out and stop packets from/to the mobile host that do not have the correct IP address in the header. The agent remote ID and a subnet mask are sent to the ISP where the agent remote ID (IMSI) is stored.

The subnet mask is an aggregate description of individual destinations on an IP subnet. An IP subnet is hosted by one router. The GGSN is a router, and thus, aggregates one or more subnets. The ISP uses the subnet information to route the response back to the GGSN, which in turn, forwards the response to the correct mobile host based on the agent remote ID. The agent remote ID also gives the ISP additional insurance that the mobile host is not faking its identify during the dynamic host configuration procedures. The GGSN may either be configured to relay the DHCP DISCOVER message to a certain DHCP server or broadcast it to the ISP network. A DHCP OFFER message is forwarded from the ISP to the mobile host including the "offered" configurations that the DHCP server can provide. Multiple offers can be received from various DHCP servers. The mobile host selects the DHCP offer that best satisfies its requirements and sends a DHCP request message to the DHCP server which provided that selected offer.

The ISP then provides an IP address to the GGSN in a DHCP acknowledgment message. The IP address is placed in a table along with the mobile's agent remote ID/IMSI and agent circuit ID/tunnel identifier for later usage in the packet filter. The GGSN also relays the DHCP acknowledgment message to the mobile host. The IP address and the agent circuit ID are used to filter all packets to/from the mobile host that do not have the correct IP address in the packet header.

Figure 8:
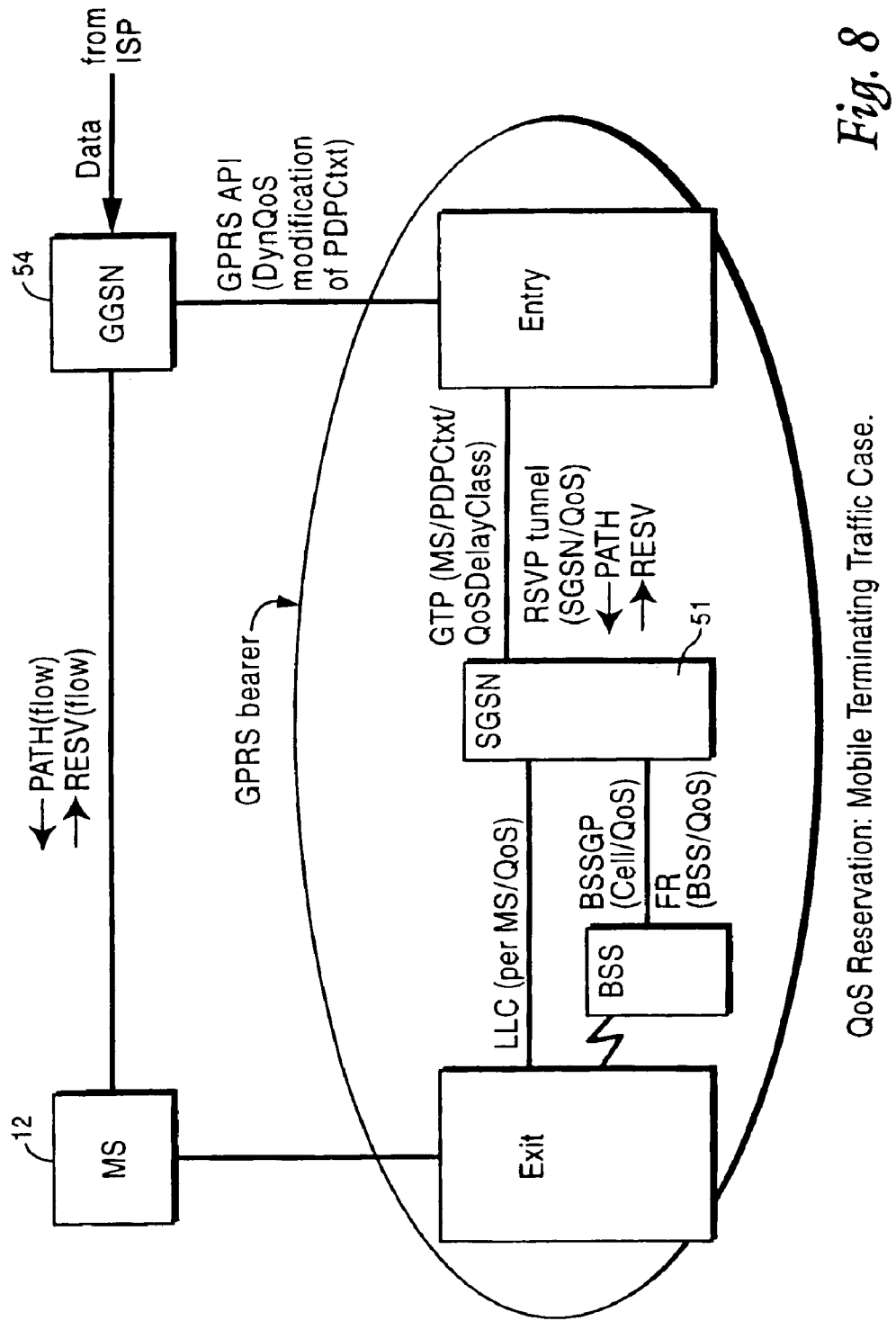
FIG. 8 is a diagram depicting an established GPRS bearer between a gateway data node and a mobile host showing reservation of quality of service for a particular application flow.

A quality of service for each user application flow activated in the PDP context is next reserved. FIG. 8 shows a diagram depicting a quality of service reservation for an application flow coming from the ISP and terminating at the mobile terminal. The GGSN 54 forwards a reserve path message to the mobile host 12 over a GPRS bearer which was established in the PDP context activation for a particular application flow directed to the mobile host 12. The mobile host then returns a reservation response to the GGSN 54. In this example, a resource reservation protocol (RSVP) is employed to permit a mobile host to request a certain quality of service for a transmission from an Internet user at an ISP. RSVP uses source and destination IP addresses as well as a UDP/TCP port to identify the application flows to be reserved. A destination IP address may have several ports, related to each application process in the system. Well-known ports are defined for several types of applications. The end systems may also negotiate to select a port other than the well-known ports. All packets that belong to the same application flow share the same identifier (address and port).

RSVP sets a temporary or "soft" reservation in each router along the path between the sender and receiver. A soft reservation has a Time To Live (TTL) associated with it. If the time to live expires, then the reservation also expires. A best effort quality of service is used to transfer the RSVP messages over the GPRS bearer.

The GGSN, acting as a router, needs to ensure that it can commit to the requested QoS reservation for its logical link towards the mobile host. As a result, the GGSN maps the requirements from the IP RSVP request to the reservation for the GPRS logical link. The first part of the GPRS logical link is the GPRS tunneling protocol (GTP) to the SGSN. GTP is carried on IP, and thus, a change of reservation for this internal IP network may be needed if the current reservation cannot handle an additional application flow. The GGSN also asks the SGSN to check the latter part of the logical link towards the mobile host. This latter part of the logical link has two "hops"—SGSN-to-BSS and BSS-to-mobile host. The SGSN controls the reservation in both hops and indicates to the GGSN whether the change in reservation for the QoS class in the PDP context is acceptable. The GGSN provides the QoS information on packet delay and bandwidth for the application flow to the next router on the chain.

The first parameter is a link dependent delay that can be divided into a rate independent part (C) and a rate dependent part (D) part. The required delay of the end-to-end path between the mobile host and the end system at the ISP can be calculated as the sum of:

$$D_{req} = S + (b/R) + C_{tot}/R + D_{tot},$$

where $D_{req}$=the implicit total delay required by the mobile host, S=a slack term between a desired and a reserved delay, b=a buffer bucket depth measured in bytes, R=a negotiated mean bit rate (e.g., IP datagrams per second), $C_{tot}$ is a sum of rate independent deviations from a fluid model, and $D_{tot}$ is the sum of rate dependent deviations from a "fluid model." The fluid model defines transport through the network if there is no packet buffering, i.e., no packeting queuing, at any node.

With this information, the delay probability distribution for the GPRS bearer may be plotted based on a mean Packet Transfer Delay (PTD), a maximum packet transfer delay, and the delay deviation parameters compared to the fluid model consisting of the rate independent (C) and rate dependent (D) parts of the link dependent delay. The graph in FIG. 9 shows the probability density graphed against the delay for these variables. The bucket depth b defines the number of bytes that a node is required to allocate to a flow in its buffer. The node does not police packets until the bucket depth b is reached. This is part of the QoS agreement. The bucket depth b is used to determine maximum buffering requirements for an application flow B for a particular QoS. The required buffer size is defined as follows:

$$B > b + C_{sum} + D_{sum} * R$$

where $C_{sum}$ and $D_{sum}$ are the sum of individual routers C and D. The routers include GGSN and other routers on the path between the mobile host and the end system at the ISP. The GGSN installs the bucket depth b for the QoS reservation.

Figure 10A:
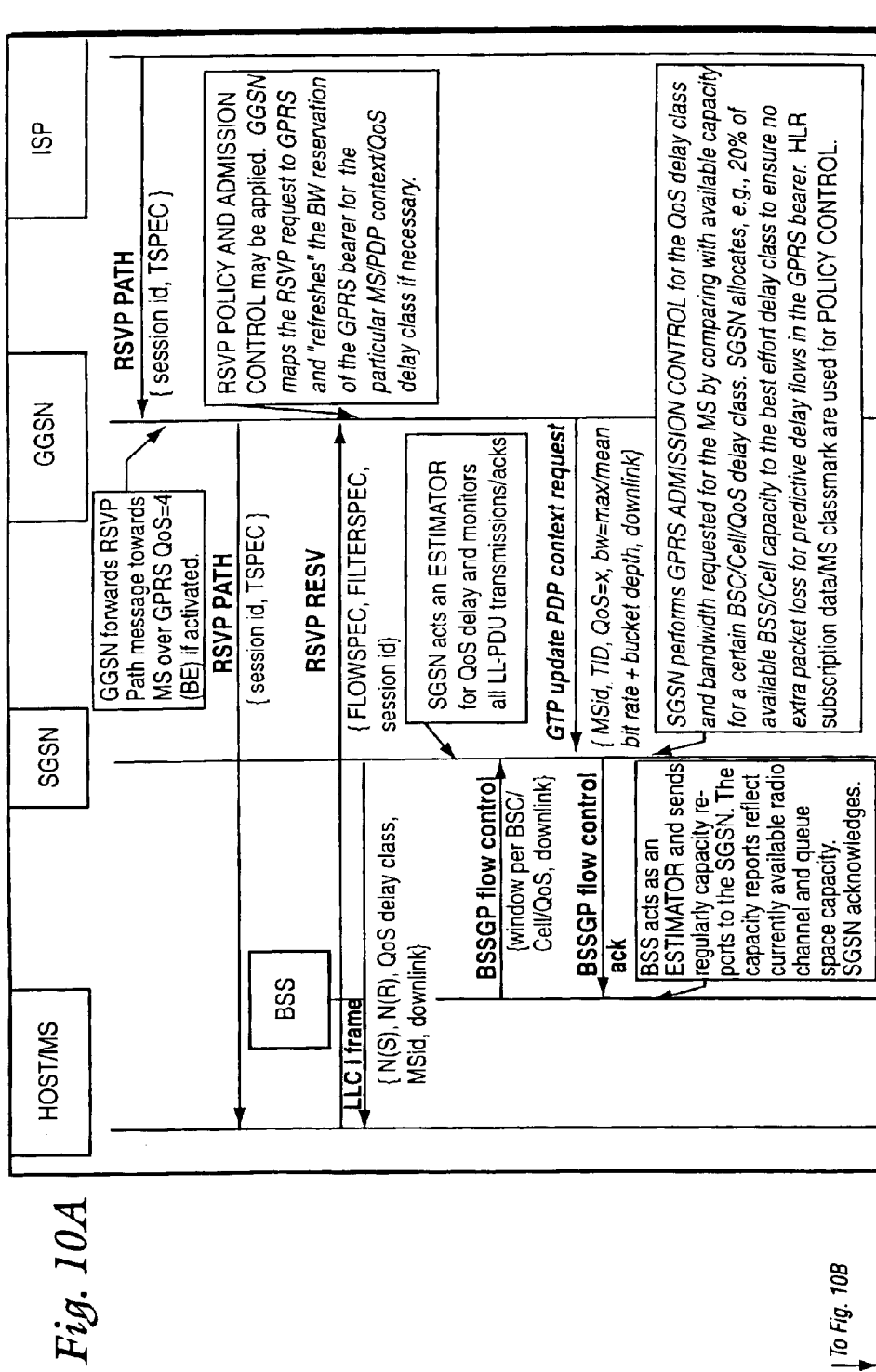
FIGS. 10A and 10B show a message sequence showing dynamic quality of service reservation procedures in accordance with the detailed GPRS example embodiment of the present invention.
Figure 10B:
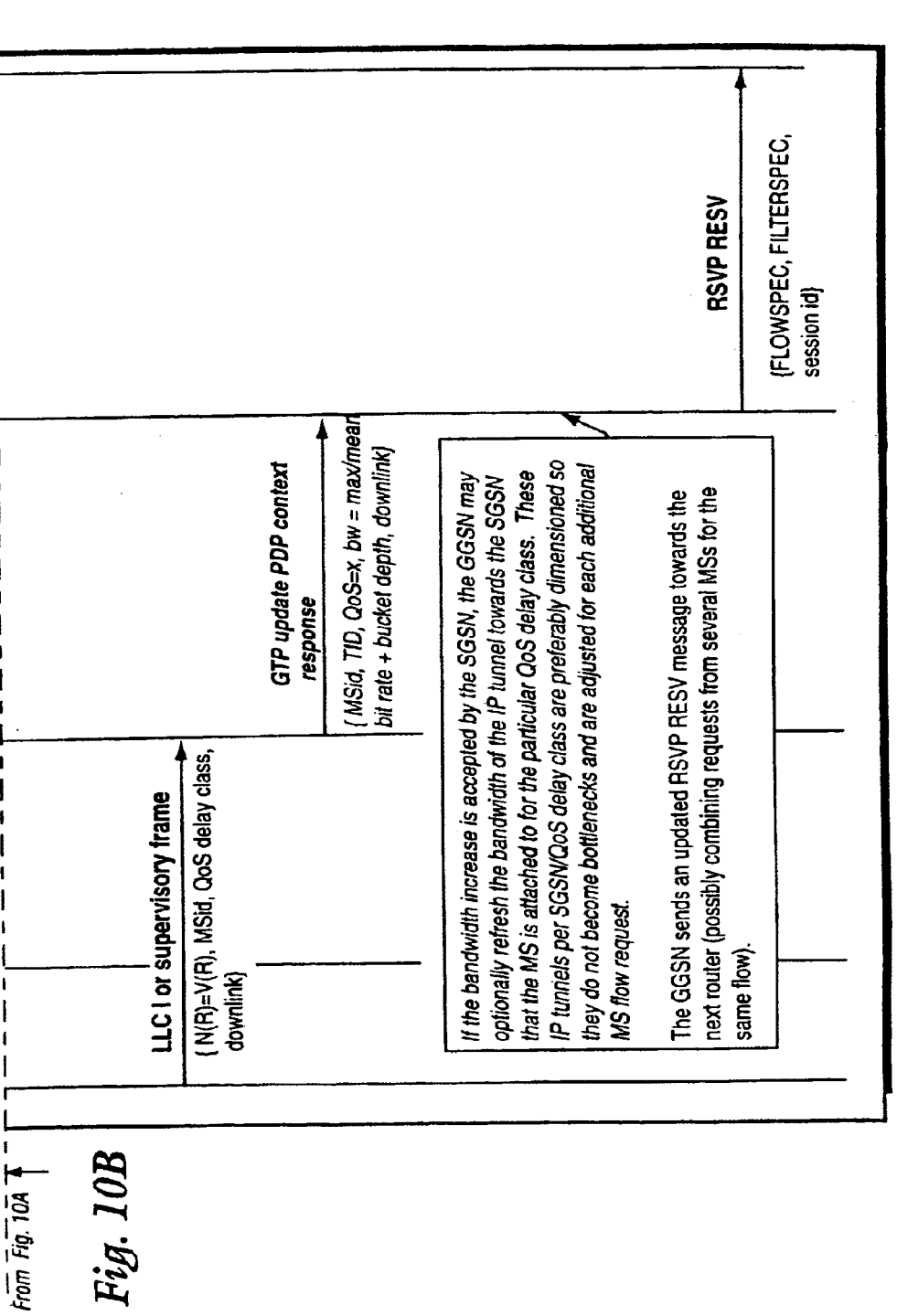

An example message sequence is now provided for a dynamic quality of service reservation for an individual application flow from the ISP terminating at the mobile host as shown in FIGS. 10A and 10B. The end system at the ISP sends a path reservation message including the session ID assigned to the flow. The GGSN forwards the RSVP path message to the mobile host using a best efforts GPRS quality of service. The path reservation message also includes a traffic specification (TSPEC). The TSPEC describes the characteristics of the application flow that the ISP end system is sending, e.g., rate and delay sensitivity.

The mobile host responds to the GGSN with a RSVP reservation (RESV) message. The RESV message includes a FLOWSPEC and a FILTERSPEC. The FLOWSPEC describes the rate and delay reservation that the mobile host is requesting for the flow. The FILTERSPEC defines in which ways the mobile host allows the network to merge the mobile host reservation with other receivers in a multicast environment. The GGSN applies policy and admission control to the reservation request. As part of the procedure, the GGSN maps the RSVP request to the GPRS GTP update PDP context request. The GTP update PDP context request is sent to the SGSN. The message relates to changing the bandwidth for the GPRS bearer for the particular mobile host, PDP context and QoS delay class to which the application flow belongs. The SGSN determines by checking the subscription corresponding to the mobile host in the HLR 42 whether the quality of service reservations may be made for the specific QoS delay class (referred to as POLICY CONTROL). The SGSN also determines whether there is sufficient capacity for the reservation for the "radio leg" (referred to as ADMISSION CONTROL). If the policy and admission controls are satisfied, the SGSN sends a GTP update PDP context response to the GGSN. The GGSN maps the GTP response to the RSVP request and changes the bandwidth reservation of the GPRS tunnel to the SGSN for the PDP context and QoS delay class, if necessary. Preferably, the reservation tunnel is overdimensioned, and therefore, a separate reservation change may not be required. The reservation tunnel preferably aggregates several mobile hosts and PDP contexts.

The SGSN estimates the requested quality of service delay by monitoring the time between link layer packet transmissions and acknowledgments. The estimates are used to evaluate if new reservations may be accepted without affecting existing reservations. The estimates are also used to provide the delay deviations compared to the fluid model that are need for RSVP. In addition, the BSS sends a BSSGP flow control message to the SGSN to inform the SGSN of the current traffic condition from the BSS to the mobile host and the availability of providing the requested quality of service rate given those traffic conditions. If the rate within a geographical radio area is low, no new reservation may be made in SGSN. Preferably, the SGSN allocates at least twenty percent of available BSC/cell capacity to the best effort quality of service delay class to minimize packet loss for predicted delay flows in the GPRS bearer. The SGSN sends a BSSGP flow control acknowledgment to the BSS for a received window.

Figure 11:
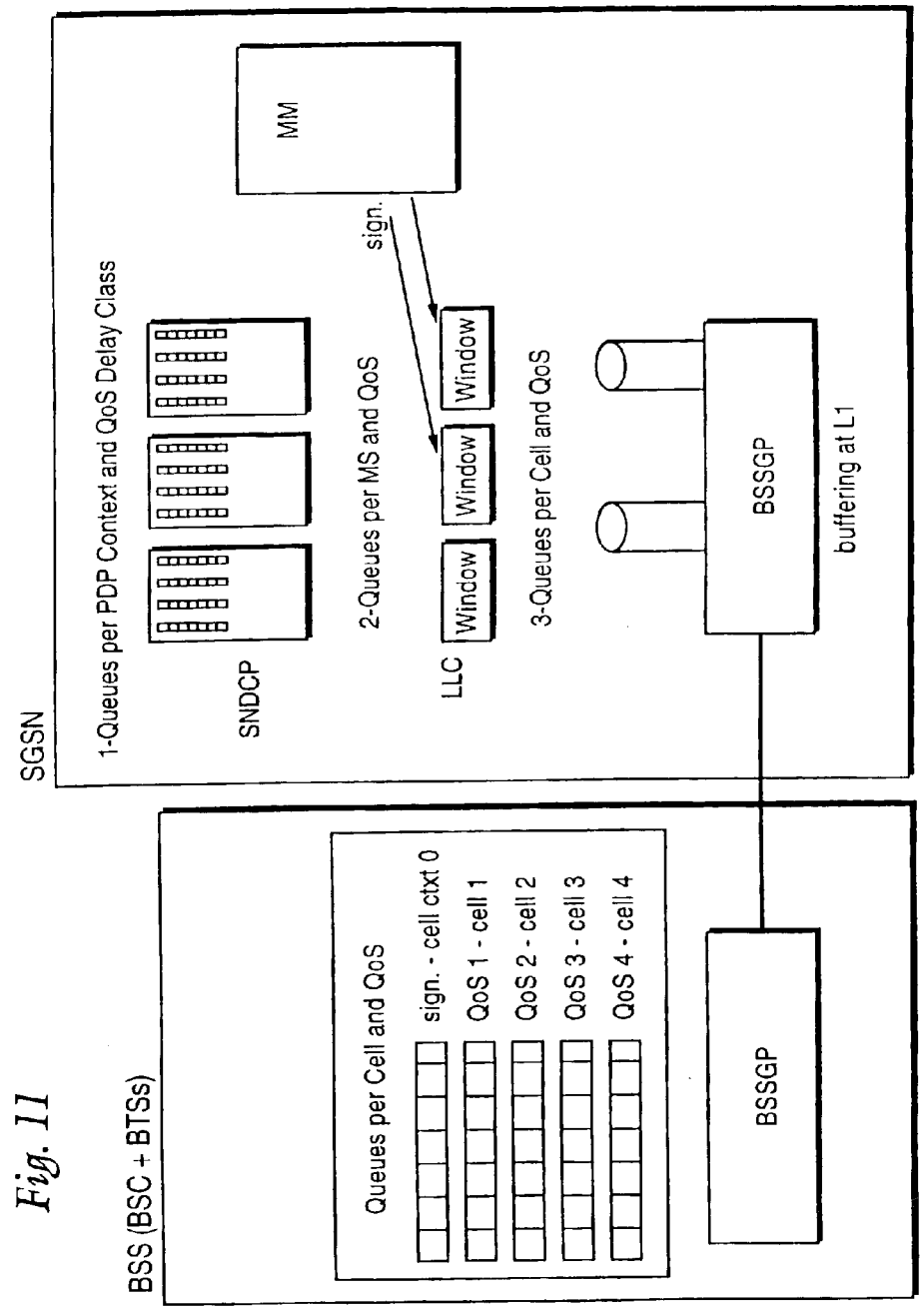
FIG. 11 is a diagram illustrating example queues and merging techniques that may be employed in serving nodes in accordance with packet classifying and scheduling procedures in the detailed example GPRS embodiment of the present invention.

The data packet forwarding procedures include packet classifying, scheduling, and policing functions. In order to classify and schedule packets in an individual application flow based on the flow's reserved quality of service, various queues/buffers are employed in the BSS and the SGSN. An example configuration of queues in the BSS and SGSN is shown in FIG. 11. The BSS includes a queue for mobility management signaling at each base station cell as well as a queue for each of four quality of service delay classes QoS 1-QoS 4 at each base station cell. The SGSN includes three different levels of queues used to classify and merge packets. The first layer of queues is at the SNDCP protocol layer. One queue is established for packets having the same PDP context and quality of service delay class. The second queue layer includes one queue for packets corresponding to the same mobile host and quality of service delay class. The third queue layer includes a queue storing packets corresponding to the same cell and quality of service delay class. Small buffering in the BSS permits efficient utilization of the limited bandwidth radio channels since packets are always available for transmission. Large buffering in the SGSN minimizes the use of limited radio resources because packets may be discarded there before they are to be transmitted over the radio air interface and hooked into a logical link control transmission loop between the SGSN and the mobile host.

Preferably, a set of packet classification, scheduling, and policing (all of which involve buffer management) are performed. Based on different classifiers, the GGSN, SGSN, and BSS each perform such a set of packet functions. A number of known packet classification, scheduling, and policing algorithms may be used. In the preferred embodiment, the GGSN "polices," (i.e., checks that the flows are within agreed limits and discards packets if not,) the RSVP application flows, classifies those application flows corresponding to their PDP context and quality of service delay class, and schedules forwarding of packets based on the tunnel protocol (GTP) reservation for the PDP context and quality of service delay class. The SGSN, on the other hand, classifies and schedules packets on a MS basis. The BSS preferably employs a first-in-first-out (FIFO) scheduling algorithm for frames of packets received with the same quality of service delay class and cell identifier. Prioritization of packet transfer scheduling between quality of service delay classes is also preferably controlled by the BSS with the BSS passing LLC frames having a higher quality of service delay class before transferring LLC frames having a lower quality of service delay class.

Figure 12:
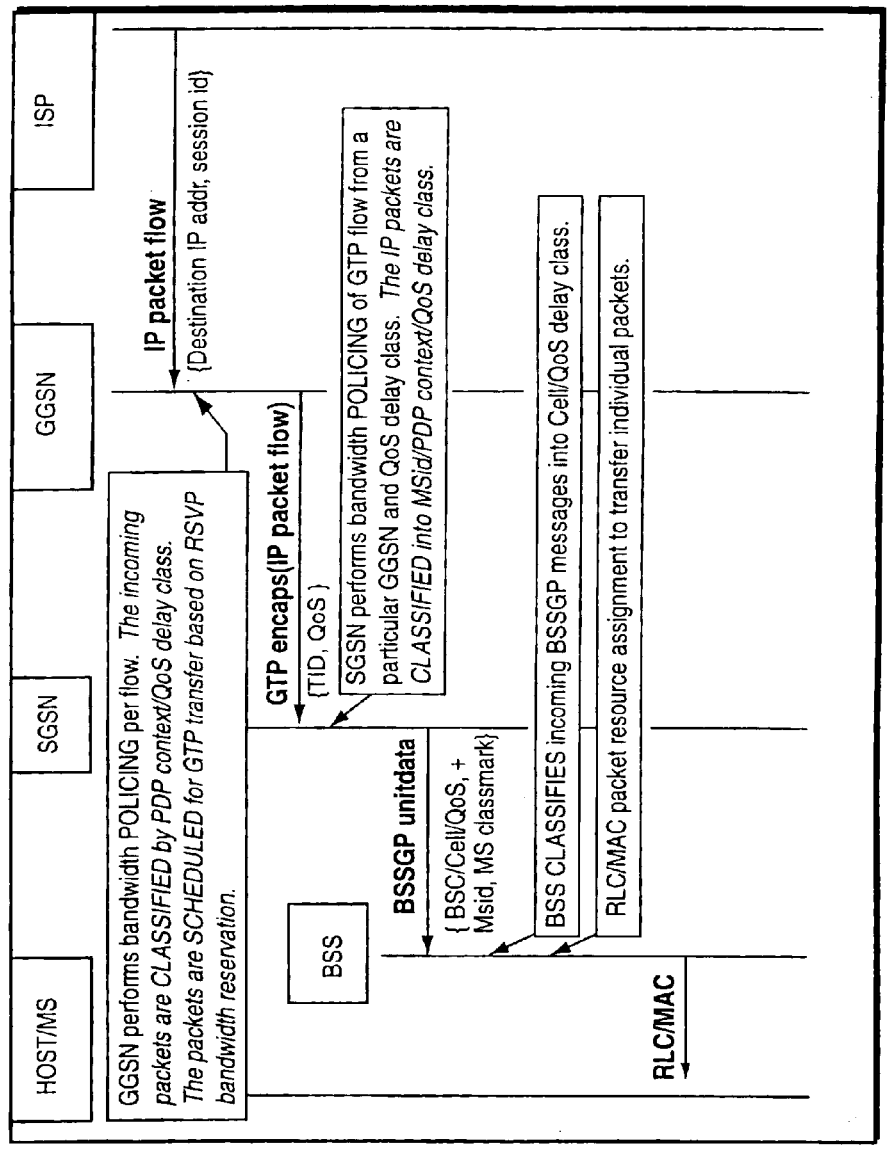
FIG. 12 is a message sequence showing forwarding of packets at the network packet layer to the mobile host from an Internet service provider (ISP) in accordance with the detailed GPRS example embodiment of the present invention.

Reference is now made to FIG. 12 which shows an example message sequence for forwarding network layer packets to the mobile host from the ISP. The GGSN receives from the ISP an IP packet application flow destined for the mobile host. The GGSN performs bandwidth policing for each application flow using for example an RSVP leaky bucket algorithm or other PDP specific algorithm. The admissible incoming packets are then classified by PDP context/quality of service delay class. Those classified packets are scheduled for GTP transfer over the GPRS logical bearer established for the mobile host's PDP context based on the RSVP bandwidth reservation for that application flow. Using the tunneling protocol (GTP), the GGSN encapsulates the IP packet flow with the tunnel identifier and the reserved quality of service for that application flow. The encapsulated packet flow is received by the SGSN which performs bandwidth policing of the flow from a particular GGSN and quality of service delay class.

The SGSN also classifies the packets corresponding to mobile subscriber ID (MSID), PDP context, and quality of service delay class. Preferably, the SGSN uses a fair queuing (e.g., bit wise round robin) algorithm for packet scheduling at the SNDCP/LLC level to merge several PDP contexts of the mobile terminal with the same quality of service delay class. A weighted fair queuing (WFQ) algorithm may be used for scheduling packet transfer at the BSSGP level using the tunnel bandwidth reservation data relating to each mobile terminal/quality of service delay class in order to merge LLC application flows of the same quality of service delay class from different mobile terminals in a single queue. The queued data is then transferred to the BSS, which classifies the incoming data by cell and quality of service delay class. As mentioned above, the BSS preferably uses a FIFO scheduling algorithm for each cell/quality of service delay class queue in addition to configurable values for priority queuing for different quality of service delay classes. The BSS then performs packet resource assignment at the RLC/MAC layers to transfer individual packets. The packets are generally divided into data blocks, and one radio data channel may be shared by several mobile terminals with each radio block having a separate identifier.

Figure 13:
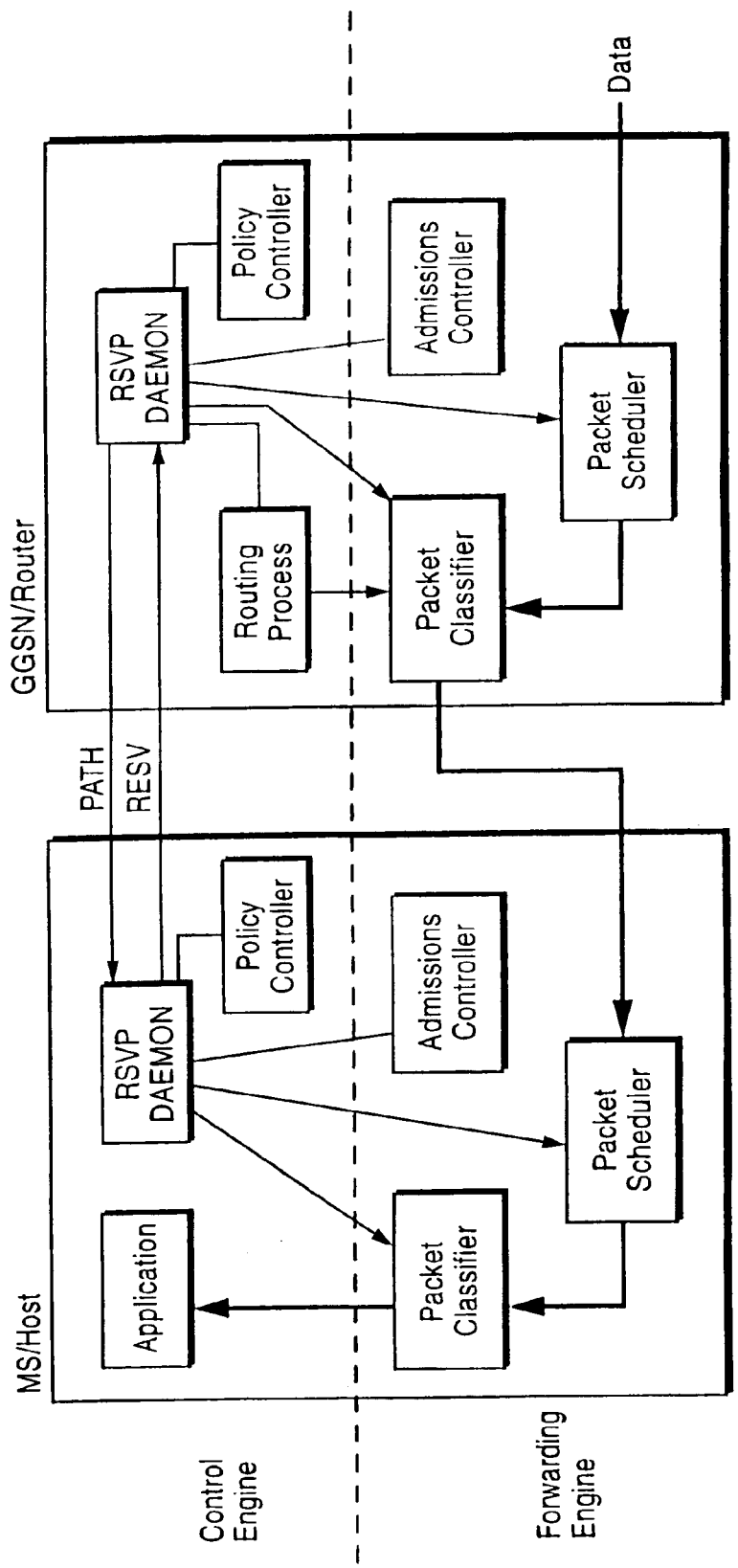
FIG. 13 is a function block diagram illustrating various example control functionalities in the mobile host and gateway node that may be used in implementing the present invention.
Figure 14:
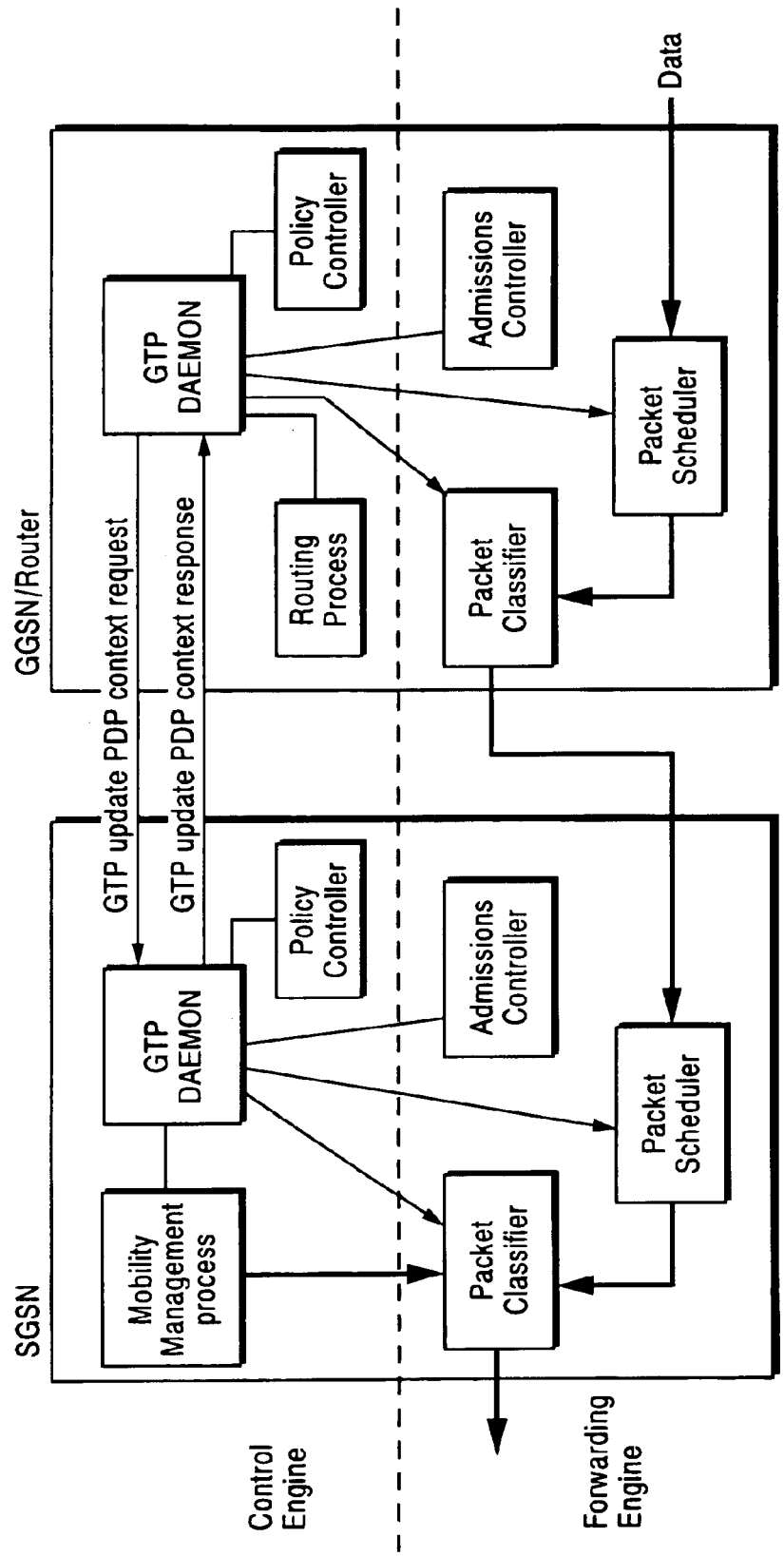
FIG. 14 is a function block diagram illustrating various control functionalities in the serving data node and the gateway node that may be used in implementing the present invention.

FIGS. 13 and 14 display the components active within the mobile host, GGSN, and SGSN, respectively, during application flow reservation and packet forwarding from an end system at an ISP to a mobile host. All three systems have a control engine and a forwarding engine.

The control engine is active during application flow reservation, while the forwarding engine is active during packet forwarding. The RSVP daemons in the mobile host and the GGSN are responsible for the resource reservation protocol exchange at the IP layer and communicate with each other using the RSVP protocol. The RSVP daemon checks with the policy controller to determine if the mobile host subscribes to the QoS. The RSVP daemon also checks with the admission controller if the forwarding system can accommodate another QoS reservation based on available resources.

The RSVP daemon instructs the packet classifier which parameter to use when separating incoming packets into different queues. The RSVP daemon instructs the packet scheduler which scheduling technique to use when merging queues towards the output ports of the system. In addition, the GGSN routing process decides to which output port a packet will be sent based on destination address, etc. The SGSN performs a similar function in its mobility management process which keeps track of the location of the mobile host. The GTP daemon has the same responsibilities as the RSVP daemon but on the GPRS link layer between SGSN and GGSN. There is an application programming interface (API) between the RSVP daemon and the GTP daemon in the GGSN in order to request and give feedback on reservations coming from IP (RSVP) to link (GPRS) layer.

While the present invention has been described with respect to particular embodiments, those skilled in the art will recognize that the present invention is not limited to the specific embodiments described and illustrated herein. Different formats, embodiments, and adaptations besides those shown and described, as well as many variations, modifications, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. In a mobile radio communications system having plural mobile radio terminals communicating with a radio network over a radio interface using radio resources from a pool of radio resources allocated to the plural mobile radio terminals, where a mobile radio terminal communicates packet data with an external network by way of a packet gateway node associated with the radio network, a method comprising:

establishing a packet session over the radio interface for the mobile radio terminal using radio resources from the pool during which plural application flows are communicated with an external network entity, each application flow having a corresponding stream of packets;

defining a corresponding quality of service parameter for each of the plural application flows such that different quality of service parameters may be defined for different ones of the application flows; and determining whether radio resources from the pool are available to support the quality of service parameters defined for each of the plural application flows, wherein establishing the packet session includes:

activating a packet session for the mobile radio terminal so that the mobile radio terminal is in communication with the gateway node, and the mobile radio terminal requesting an end-to-end configuration between the mobile radio terminal and the external network entity, and wherein the end-to-end configuration request establishes a network packet layer bearer between the mobile radio terminal and the gateway node permitting relay of data packets between the external network entity and the mobile radio terminal even though a network packet layer address is not assigned to the mobile radio terminal.

2. The method in claim 1, further comprising:

delivering packets corresponding to each application flow from the external network entity to the mobile radio terminal in accordance with the defined corresponding quality of service.

3. The method in claim 2, wherein the quality of service is defined for said each application flow at a network packet layer for the end-to-end communication.

4. The method in claim 1, wherein different qualities of service have different allocated bandwidths, delays, or reliability.

5. The method in claim 4, wherein the different quality of services include one class of service that is best effort where packets in an application flow may be dropped and another class of service that is predictive where packets in an application flow are not dropped.

6. The method in claim 1, wherein a quality of service includes a delay class that specifies one or more of the following: a maximum packet transfer rate, a mean packet transfer rate, and a packet burst size of an application flow.

7. The method in claim 1, further comprising:
storing subscription information for the mobile radio terminal specifying whether the mobile radio terminal may request a quality of service for specific application flows, and
checking the subscription information before defining quality of service parameters.

8. The method in claim 7, further comprising:
making available for the packet session each quality of service to which a user of the mobile radio terminal subscribes.

9. The method in claim 1, wherein session control messages are communicated between the mobile radio terminal and the gateway node using a best efforts quality of service delay class.

10. The method in claim 1, wherein the gateway node functions as a dynamic host configuration agent serving the mobile radio terminal as a client relaying packets between the mobile radio terminal and the external network entity.

11. The method in claim 10, further comprising:
adding a remote agent identification corresponding to a mobile radio terminal identifier to messages intended for the external network entity.

12. The method in claim 11, wherein during configuration, the dynamic host configuration agent captures and stores a unique network packet layer address for the mobile radio terminal for the established session for each application flow activated during the established session.

13. The method in claim 12, further comprising:
establishing a data communications tunnel corresponding to the network layer bearer between the gateway node and the mobile radio terminal, and
establishing a relationship in the gateway node between a mobile radio terminal's identifier, the established tunnel, and the network packet layer address for the mobile radio terminal for the established session.

14. The method in claim 13, further comprising:
analyzing packets received at the gateway node and permitting only packets having a destination or source corresponding to one of the mobile radio terminal network layer addresses stored for the established session.

15. The method in claim 13, further comprising:
the gateway node routing packets according to a shortest path based on the network layer address for the mobile radio terminal for the established session.

16. In a mobile radio communications system having plural mobile radio hosts communicating with a radio network over a radio interface using radio resources from a pool of resources allocated to the plural mobile radio hosts where a mobile host communicates packet data with an external network by way of a packet gateway node associated with the radio network and a packet serving node associated with the radio network, a method comprising:
establishing a packet session for the mobile radio host over the radio interface using radio resources from the pool during which plural application flows are communicated between the mobile host and an external network entity, each application flow having a corresponding stream of packets;
making a reservation request for a particular quality of service for an individual application flow associated with the packet session;
determining whether the reservation request can be met with radio resources from the pool;
if so, establishing a logical bearer between the mobile radio host and the gateway node to bear plural ones of the individual application flows having different corresponding quality of services;
classifying and scheduling packets corresponding to each application flow from the external network to the mobile radio host over the bearer in accordance with the quality of service corresponding to the application packet stream;
the serving node monitoring each of the application flows from the gateway node to determine whether a data transmission volume limit is exceeded; and
if so, the serving node discarding packets corresponding to an application flow having a lowest quality of service reserved.

17. The method in claim 16, further comprising:
the serving node determining if the reservation request for the particular quality of service is permitted by a subscription corresponding to the mobile radio host.

18. The method in claim 16, further comprising:
the serving node evaluating if the reservation request for the particular quality of service can be supported from the serving node to the mobile radio host based on a current traffic load of existing radio communications in the area where the mobile radio host is being served.

19. The method in claim 18, wherein the evaluating step includes the serving node estimating a delay and a bandwidth requirement corresponding to the requested quality of service.

20. The method in claim 19, further comprising:
the serving node providing the gateway node the estimated delay and an estimate of a bandwidth requirement corresponding to the reservation request, and
the gateway node providing the delay and bandwidth estimates to a network layer protocol.

21. The method in claim 16, further comprising:
the gateway node renewing the quality of service reservation.

22. The method in claim 16, further comprising:
the gateway node monitoring said each application flow to ensure that the reserved quality of service for that application flow is met.

23. The method in claim 16, further comprising:
the gateway node scheduling transfer of packets corresponding to one of the application flows to ensure that the reserved quality of service for that application flow is met.

24. The method in claim 16, further comprising:
the gateway node classifying packets using the reserved quality of service for the application flow to which each packet belongs.

25. In a mobile radio communications system having plural mobile radio hosts communicating with a radio network over a radio interface using radio resources from a pool of radio resources allocated to the plural mobile radio hosts, where the mobile radio hosts communicate packet data with an external network by way of a packet gateway node and a packet serving node associated with the radio network, a method comprising:

establishing a packet session over the radio interface for a mobile radio host using radio resources from the pool during which plural application flows are communicated with an external network entity, each application flow having a corresponding stream of packets;

defining a corresponding quality of service parameter for each of the plural application flows such that different quality of service parameters may be defined for different ones of the application flows;

the serving node merging packets from different sessions with the same quality of service destined for different mobile radio hosts within a same geographical service area; and the serving node assigning packets destined for a same geographical service area but with different qualities of service to different priority queues corresponding to the different qualities of service, wherein a larger number of packets are removed from a queue having a higher quality of service than a queue having a lower quality of service.

26. The method in claim 25, wherein the merging is performed using first in first out scheduling except when packets cannot be delivered within a specified time.

27. The method in claim 25, further comprising:

the serving node assigning packets destined for a same geographical service area but with different qualities of service to different priority queues corresponding to the different qualities of service, wherein a larger number of packets are removed from a queue having a higher quality of service than a queue having a lower quality of service.

28. For use in a mobile radio communications system having plural mobile radio hosts communicating with a radio network over a radio interface using radio resources from a pool of radio resources allocated to the plural mobile radio hosts, where the mobile radio hosts communicate packet data with an external network by way of a packet gateway node and a packet serving node associated with the radio network, wherein a packet session is established over the radio interface for a mobile radio host using radio resources from the pool during which plural application flows are communicated with an external network entity, each application flow having a corresponding stream of packets, and a corresponding quality of service parameter is defined for each of the plural application flows such that different quality of service parameters may be defined for different ones of the application flows, a radio packet network node, comprising:

electronic circuitry configured to merge packets from different sessions with a same quality of service destined for different mobile radio hosts within a same geographical service are and to assign packets destined for a same geographical service area but with different qualities of service to different priority queues corresponding to the different qualities of service, wherein the electronic circuitry is configured to remove a larger number of packets from a queue having a higher quality of service than a queue having a lower quality of service.

29. The radio packet network node in claim 28, wherein the electronic circuitry is configured to perform the merging using first in first out scheduling except when packets cannot be delivered within a specified time.

30. The radio packet network node in claim 28, wherein the electronic circuitry is configured to determine if a reservation request for a particular quality of service is permitted by a subscription corresponding to the mobile radio host.

31. The radio packet network node in claim 30, wherein the electronic circuitry is configured to evaluate if the reservation request for the particular quality of service can be supported from the radio packet network node to the mobile radio host based on a current traffic load of existing radio communications in the area where the mobile radio host is being served.

32. The radio packet network node in claim 31, wherein the evaluation includes an estimation of a delay and a bandwidth requirement corresponding to the requested quality of service.

33. For use in a mobile radio communications system having plural mobile radio hosts communicating with a radio network over a radio interface using radio resources from a pool of radio resources allocated to the plural mobile radio hosts, where the mobile radio hosts communicate packet data with an external network by way of a packet gateway node and a packet serving node associated with the radio network, wherein a packet session is established over the radio interface for a mobile radio host using radio resources from the pool during which plural application flows are communicated with an external network entity, each application flow having a corresponding stream of packets, and a corresponding quality of service parameter is defined for each of the plural application flows such that different quality of service parameters may be defined for different ones of the application flows, a radio packet network node, comprising:

electronic circuitry configured to merge packets from different sessions with a same quality of service destined for different mobile radio hosts within a same geographical service area and to monitor each of the application flows to determine whether a data transmission volume limit is exceeded, and if so, to discard packets corresponding to an application flow having a lowest quality of service reserved.

* * * * *